United States Patent
Yano et al.

(10) Patent No.: US 9,211,845 B2
(45) Date of Patent: Dec. 15, 2015

(54) DOORS FOR CONSOLE BOXES

(71) Applicants: TOYOTA SHATAI KABUSHIKI KAISHA, Aichi (JP); TOYOTA JIDOSHA KABUSHIKI KAISHA, Aichi (JP)

(72) Inventors: Toshiki Yano, Aichi (JP); Takamichi Fujine, Aichi (JP); Youhei Emura, Aichi (JP); Masato Noritake, Aichi (JP); Yuichi Kaneko, Aichi (JP); Takashi Murata, Aichi (JP)

(73) Assignees: Toyota Shatai Kabushiki Kaisha, Aichi-Ken (JP); Toyota Jidosha Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 14/364,661

(22) PCT Filed: Nov. 20, 2012

(86) PCT No.: PCT/JP2012/080056
§ 371 (c)(1),
(2) Date: Jun. 11, 2014

(87) PCT Pub. No.: WO2013/088918
PCT Pub. Date: Jun. 20, 2013

(65) Prior Publication Data
US 2014/0375039 A1     Dec. 25, 2014

(30) Foreign Application Priority Data

Dec. 15, 2011   (JP) ................. 2011-274123

(51) Int. Cl.
| | |
|---|---|
| *B60R 7/04* | (2006.01) |
| *B60R 21/055* | (2006.01) |
| *E05B 77/02* | (2014.01) |
| *E05B 83/32* | (2014.01) |
| *B60R 21/02* | (2006.01) |
| *B60R 21/00* | (2006.01) |

(52) U.S. Cl.
CPC ................. *B60R 7/04* (2013.01); *B60R 21/055* (2013.01); *E05B 77/02* (2013.01); *E05B 83/32* (2013.01); *B60R 2021/0048* (2013.01); *B60R 2021/0266* (2013.01)

(58) Field of Classification Search
CPC ... B60R 7/04; B60R 2021/0266; E05B 77/10; E05B 77/12; E05B 83/32; E05B 77/54; B60N 2/466; B60N 2/4686; B60N 2011/0005
USPC ................... 180/281; 296/1.09, 24.34, 24.46, 296/187.05, 37.8
See application file for complete search history.

(56) References Cited

U.S. PATENT DOCUMENTS

2014/0375039 A1* 12/2014 Yano et al. .................... 280/748

FOREIGN PATENT DOCUMENTS

| | | |
|---|---|---|
| DE | 10 2006 051 948 B3 | 6/2008 |
| JP | 63-126146 U | 8/1988 |
| JP | 2005-306223 A | 11/2005 |
| JP | 2010-30555 A | 2/2010 |
| JP | 2011-201442 A | 10/2011 |

* cited by examiner

*Primary Examiner* — Karen Beck
(74) *Attorney, Agent, or Firm* — Christensen Fonder PA

(57) ABSTRACT

Embodiments of the present invention may include a door for a console box having a door outer, a door inner and a lock mechanism. The door inner is mounted to the door outer, and has a pair of mounting walls. The lock mechanism releasably locks the door at a position where the door closes an opening of a box main body of the console box. The lock mechanism has a knob that is pivotably mounted between the pair of mounting walls and is operated when releasing the lock mechanism. The door outer has a pair of ribs that push the pair of mounting walls away from each other to detach the knob from the mounting walls when the door outer receives a shock toward the door inner.

3 Claims, 10 Drawing Sheets

DOORS FOR CONSOLE BOXES

PRIORITY CLAIM

The present application is a National Phase entry of PCT Application No. PCT/JP2012/080056, filed Nov. 20, 2012, which claims priority from Japanese Patent Application No. 2011-274123, filed Dec. 15, 2011, the disclosures of which are hereby incorporated by reference herein in their entirety.

BACKGROUND OF THE INVENTION

1. Field of the Invention

Embodiments of the present invention relate to a door (cover) for a console box.

2. Description of the Related Art

A console box has a box main body and a door capable of closing an opening of the box main body. The door has a door outer and a door inner mounted to the door outer. Japanese Laid-Open Patent Publication No. 2011-201442 discloses a door in which the door outer and the door inner are formed of a synthetic resin exhibiting rigidity. When the head of an occupant sitting a rear seat hits the surface of the door outer due to a shock when a vehicle is hit from behind, the door outer may be bent from the impact with the head. In this way, the shock that the head receives from the door outer is reduced.

The console box may be equipped with a lock mechanism for locking the door in a state in which the door closes the opening of the box main body. The door outer is bent by the shock received from the head of the occupant, and the door outer may hit the lock mechanism. In this case, the bending of the door outer may be controlled. When the vehicle is hit from behind, there may be a large impact. In this case, the shock imparted to the head from the door outer may be not sufficiently suppressed.

Thus, there has been a need for a door for a console box equipped with a lock mechanism. The lock mechanism is capable of sufficiently suppressing shock that the head of an occupant receives from a door outer when the head hits a surface of the door outer.

SUMMARY OF THE INVENTION

According to an aspect of the present invention, a door for a console box has a door outer, a door inner mounted to the door outer, and a lock mechanism configured to releasably lock the door at a position where the door closes an opening of a box main body of the console box. The door inner has a pair of mounting walls. The lock mechanism has a knob that is pivotably mounted between the pair of mounting walls. The knob is operated when releasing the lock mechanism. The door outer has a pair of ribs that push the pair of mounting walls away from each other to detach the knob from the mounting walls when the door outer receives a shock toward the door inner.

Thus, when the head of the occupant hits the surface of the door outer, the knob is detached from the mounting walls. When the door receives the shock due to the hitting by the head of the occupant, the door is bent by the shock. Even when the door is equipped with a lock mechanism, the bending of the door outer may not be reduced by the lock mechanism. As a result, the bending amount of the door outer increases. This makes it possible to sufficiently suppress the shock that the head of the occupant receives from the door outer.

DETAILED DESCRIPTION OF THE INVENTION

Figure 1:
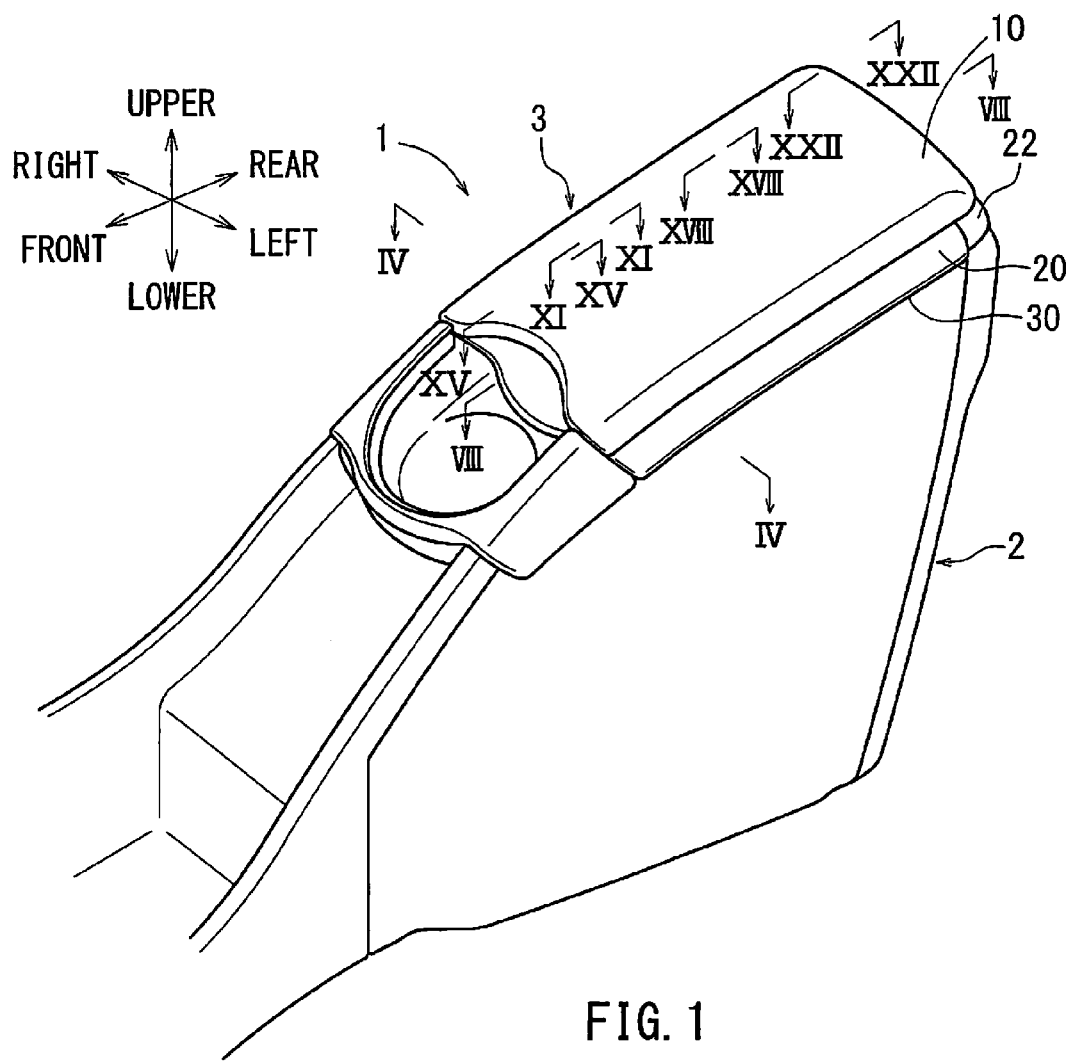
FIG. 1 is a perspective view of a part of a console box.

An embodiment of the present invention will be described with reference to the drawings. The upper, lower, front, rear, left, and right sides in the drawings are determined based on a console box 1 as the reference.

Figure 2:
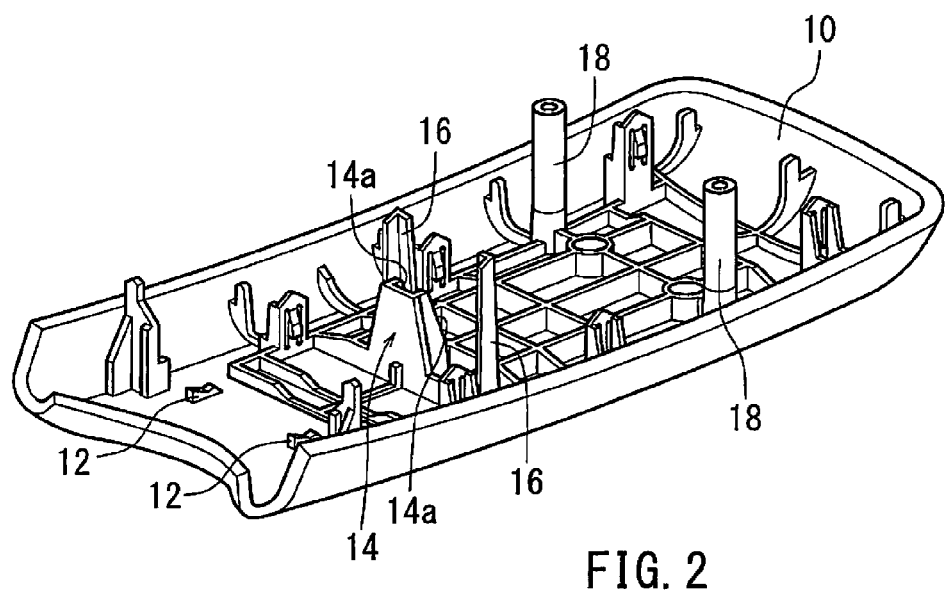
FIG. 2 is a perspective view of a door for the console box.
Figure 3:
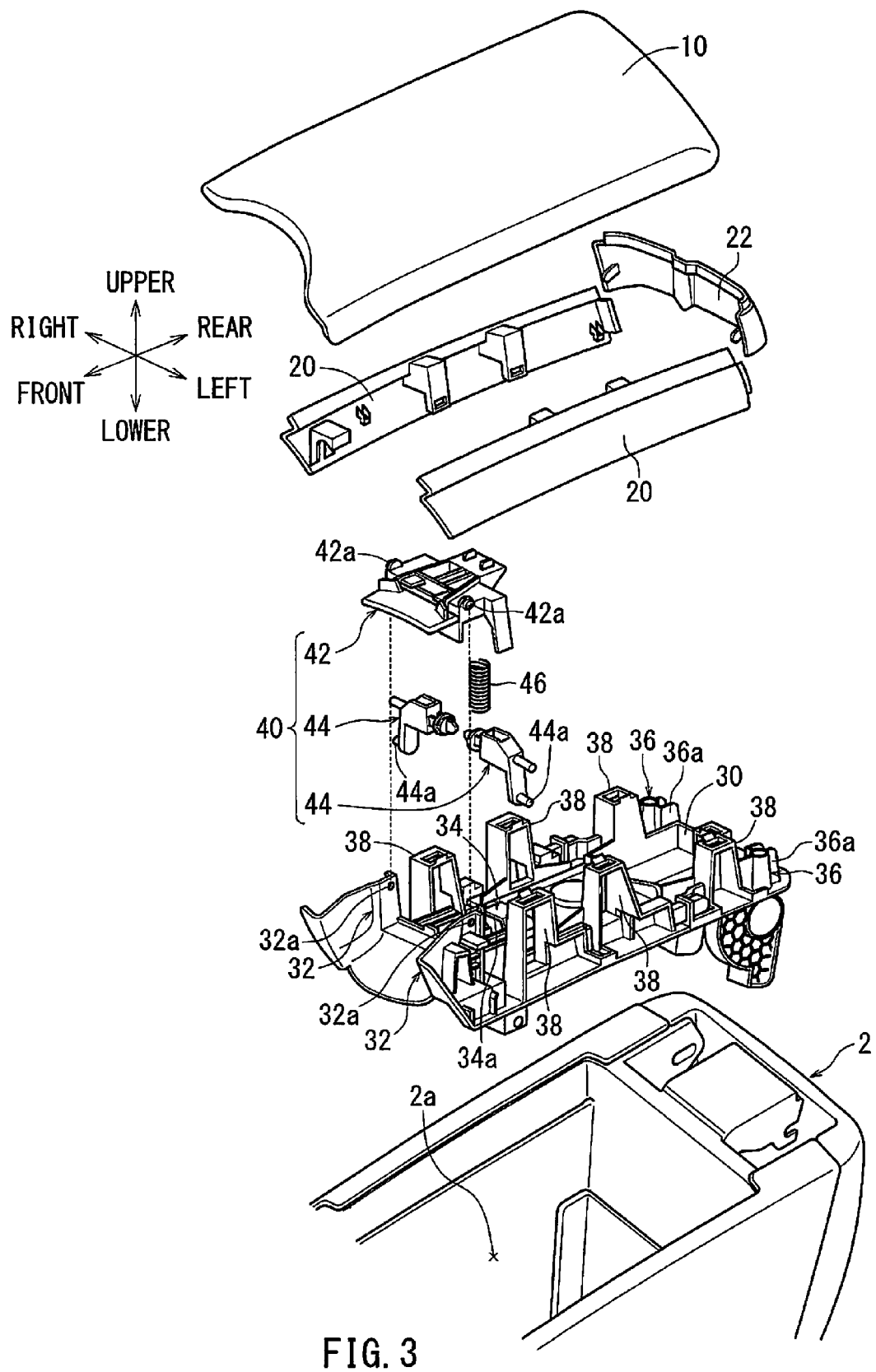
FIG. 3 is a perspective view of a part of a box main body of the console box and an exploded perspective view of the door.

As shown in FIGS. 1 to 3, the console box 1 has a box main body 2 and a door (cover) 3. The box main body 2 has an opening 2a, and can accommodate articles (not shown). The door 3 is connected to the box main body 2 by a hinge (not shown), and opens and closes the opening 2a of the box main body 2. The door 3 has a door outer 10 and a door inner 30. The door inner 30 is mounted to the door outer 10 by an engagement member (for example, a screw or a claw) formed on the inner surface of the door outer 10.

The door outer 10 constitutes a framework of the door 3, and constitutes an outside design of the door 3. The door inner 30 constitutes an inside design of the door 3. Right and left mounting walls 32 are formed on the door inner 30. The door 3 is provided with a lock mechanism 40. The lock mechanism 40 locks the door 3 to the box main body 2 at the position where it closes the opening 2a.

As shown in FIG. 3, the lock mechanism 40 has a knob 42 and levers 44. The knob 42 is rotatably mounted to the mounting walls 32 of the door inner 30 by pins 42a, and is situated between the right and left mounting walls 32. The levers 44 have pins 44a which advance and retreat through operation of the knob 42. When the occupant operates the knob 42 against the biasing force of a compression sprig 46, the pins 44a are detached from right and left recess holes (not shown) of the box main body 2. As a result, the lock mechanism 40 locks and unlocks the door 3 at the position where the opening 2a of the box main body 2 is closed.

As shown in FIG. 3, the door 3 has side garnishes 20 and a rear garnish 22. The side garnishes 20 and the rear garnish 22 cover the gap between the door outer 10 and the door inner 30, thereby enhancing the design property of the door 3.

As shown in FIG. 2, ribs 12 are formed at a right front portion and a left front portion of the inner surface of the door outer 10. The ribs 12 are directed toward the pins 42a of the lock mechanism 40 (See FIG. 3). A rib 14 is formed at a front portion of the inner surface of the door outer 10. The rib 14 has a front wall and right and left walls extending from the right and left edges of the front wall. The right and left walls have, at their distal end portions, inclined sides 14a inclined so as to be tapered toward the distal end of the rib.

Figure 14:
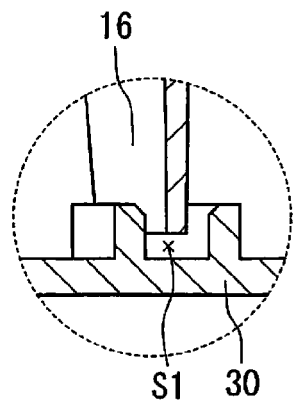
FIG. 14 is an enlarged view of XIV in FIG. 11.

L-shaped ribs 16 are formed at a right front portion and a left front portion of the inner surface of the door outer 10 (See FIG. 2). As shown in FIG. 14, the length of the ribs 16 is such that gaps S1 are normally formed between the distal ends of the ribs 16 and the door inner 30.

Figure 21:
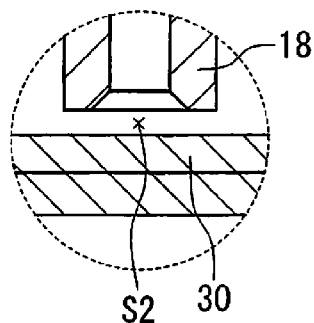
FIG. 21 is an enlarged view of XXI in FIG. 18.

Cylindrical bosses 18 are formed at a left rear portion and a right rear portion of the inner surface of the door outer 10. The length of the bosses 18 is such that gaps S2 are normally formed between the distal ends of the bosses 18 and the door inner 30 (See FIG. 21). The door outer 10 is integrally formed of a synthetic resin exhibiting rigidity. The outer surface of the door outer 10 is covered with a skin 10a such as fabric which exhibits a cushioning property. The skin 10a can enhance the design property of the door outer 10.

Figure 8:
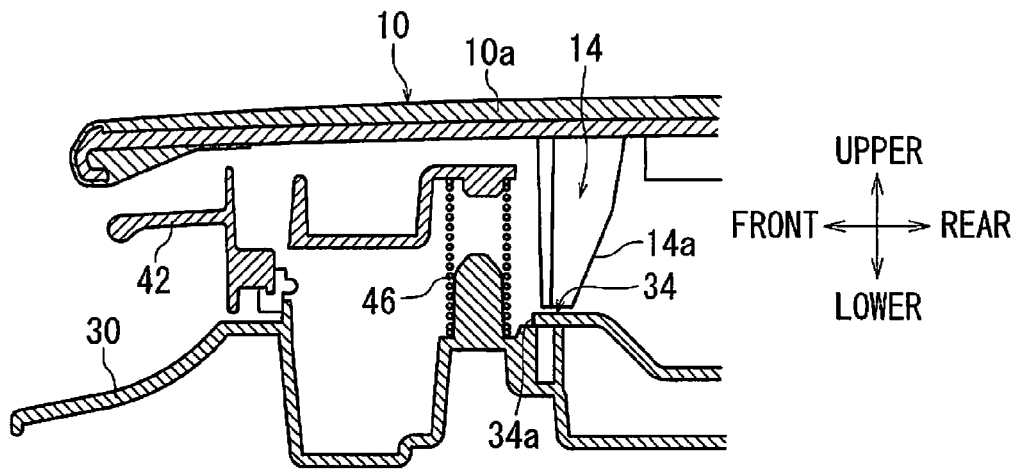
FIG. 8 is a vertical cross-sectional view of a front portion of the console box near a rib taken along line VIII-VIII in FIG. 1.
Figure 11:
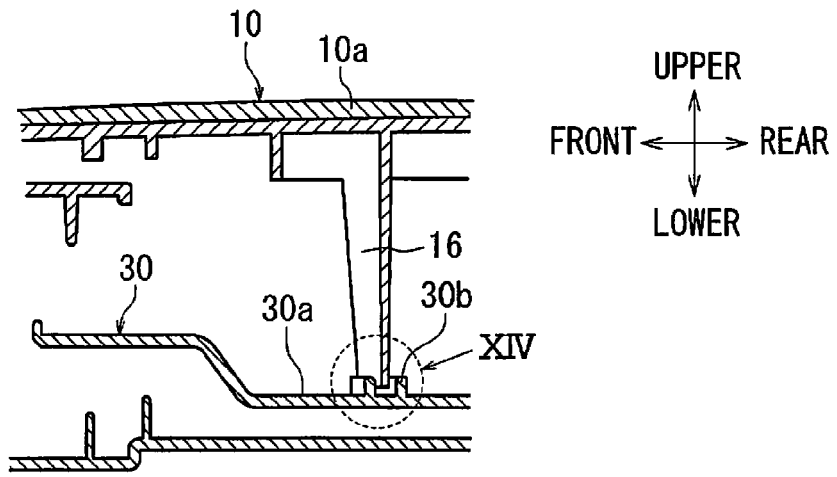
FIG. 11 is a vertical cross-sectional view of a part of the console box near another rib taken along line XI-XI in FIG. 1.

As shown in FIG. 8, an abutment surface 34 is formed at a front portion of the inner surface of the door inner 30. The abutment surface 34 faces the rib 14 of the door outer 10. As shown in FIG. 11, guides 30b are formed at a right front portion and a left front portion of the inner surface of the door inner 30. The guides 30b are situated so as to guide the distal ends of the ribs 16 of the door outer 10.

Figure 15:
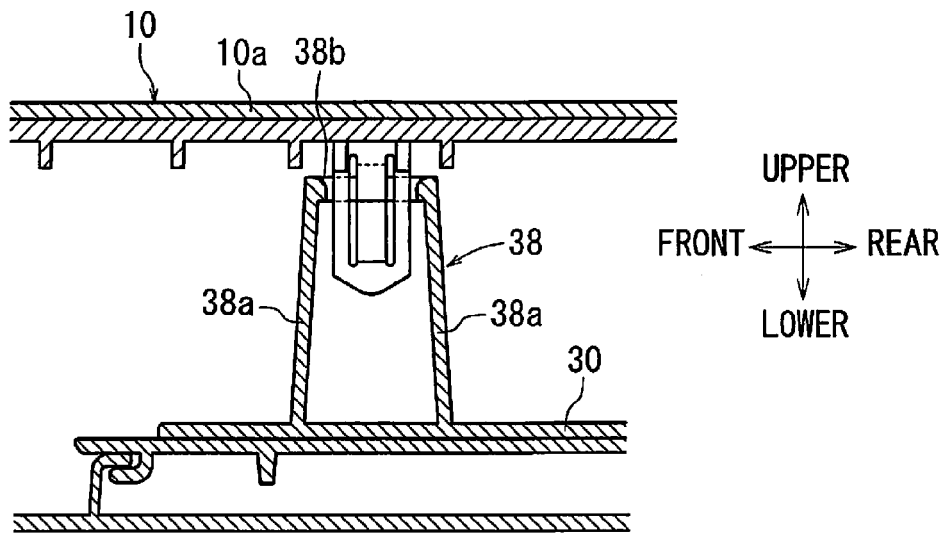
FIG. 15 is a vertical cross-sectional view of a part of the console box near a buffer body taken along line XV-XV in FIG. 1.

As shown in FIG. 3, bosses 36 are formed at a right rear portion and a left rear portion of the inner surface of the door inner 30. The bosses 36 have a cylindrical shape and have ribs 36a. As shown in FIGS. 3 and 15, buffer bodies 38 are formed on the inner surface of the door inner 30. Each buffer body 38 has a pair of legs 38a and a top plate 38b bridging between the distal ends of the pair of legs 38a. Six buffer bodies 38 are arranged in three rows in the longitudinal direction and in two rows in the lateral direction. The door inner 30 is formed through mounting of two members formed of a synthetic resin exhibiting rigidity.

The condition of the door 3 when a large shock is applied to the front portion of the door 3 and the condition of the door 3 when a large shock is applied to the rear portion of the door 3 will be described. For example, a large shock is applied to the door 3 when a head of an occupant hits the surface of the door outer 10 when a vehicle is hit from behind.

Figure 4:
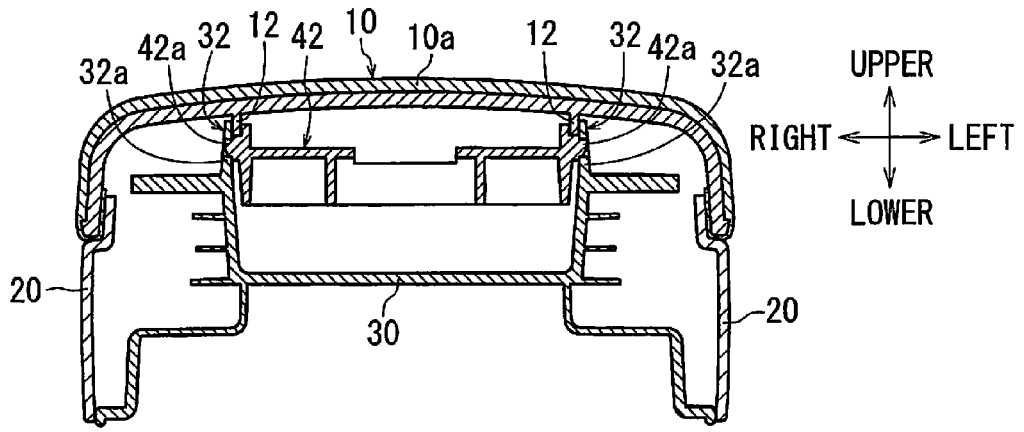
FIG. 4 is cross-sectional view of the console box taken along line IV-IV in FIG. 1.
Figure 5:
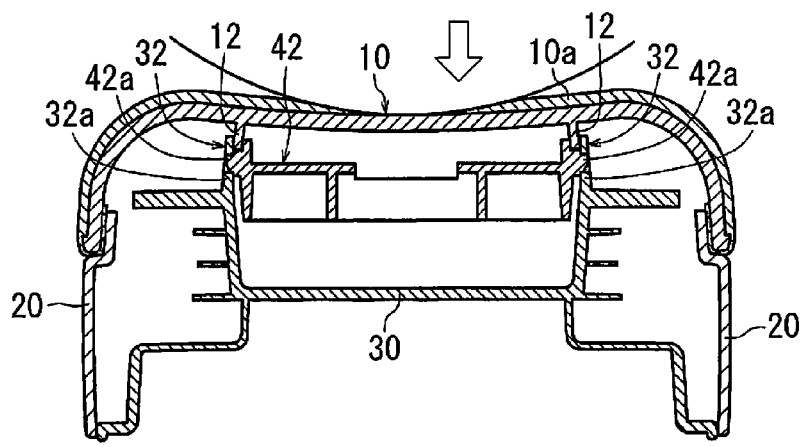
FIG. 5 is a vertical cross-sectional view of the console box when a front portion of the door receives a shock.
Figure 6:
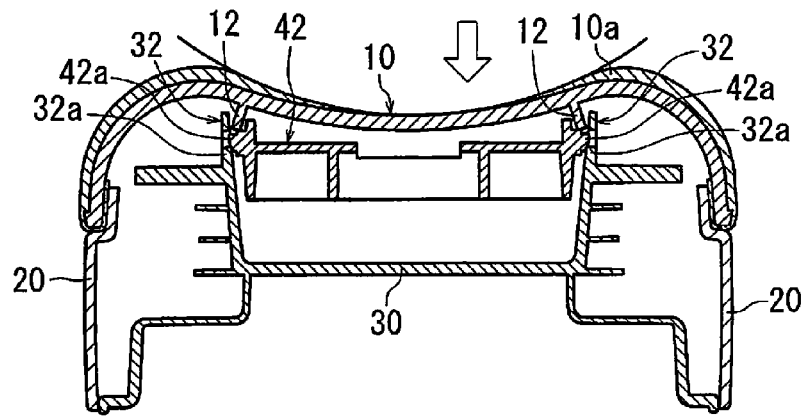
FIG. 6 is a vertical cross-sectional view of the console box when the front portion of the door receives a large shock.

As shown in a normal condition in FIG. 4, when a large shock is applied to the front portion of the door 33 as shown in FIGS. 5 and 6, the front portion of the door outer 10 is bent. The ribs 12 of the door outer 10 are directed toward the pin 42a of the knob 42 of the lock mechanism 40. Thus, the ribs 12 push the door inner 30 so as to move the right and left mounting walls 32 away from each other.

Figure 7:
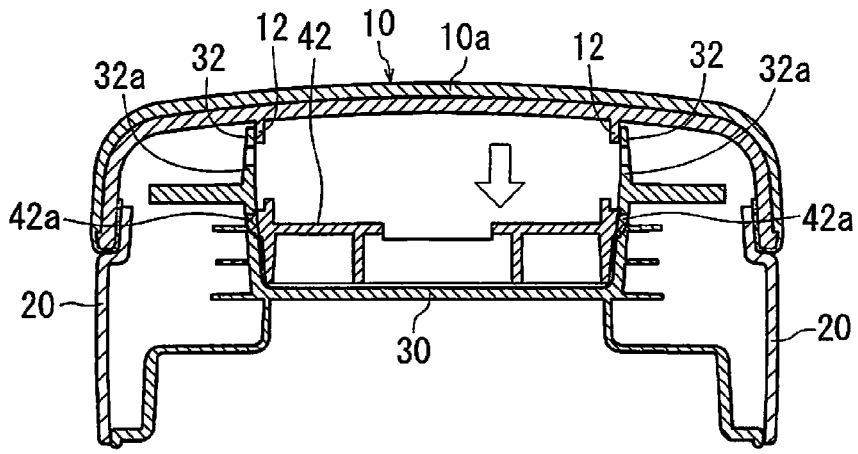
FIG. 7 is a vertical cross-sectional view of the console box after the front portion of the door receives a large shock.

As shown in FIG. 6, the pins 42a are detached from the mounting holes 32a of the mounting walls 32. As a result, the knob 42 is detached as shown in FIG. 7. Due to its own elastic restoring force, the front portion of the bent door outer 10 is restored to the condition before such bending.

Figure 9:
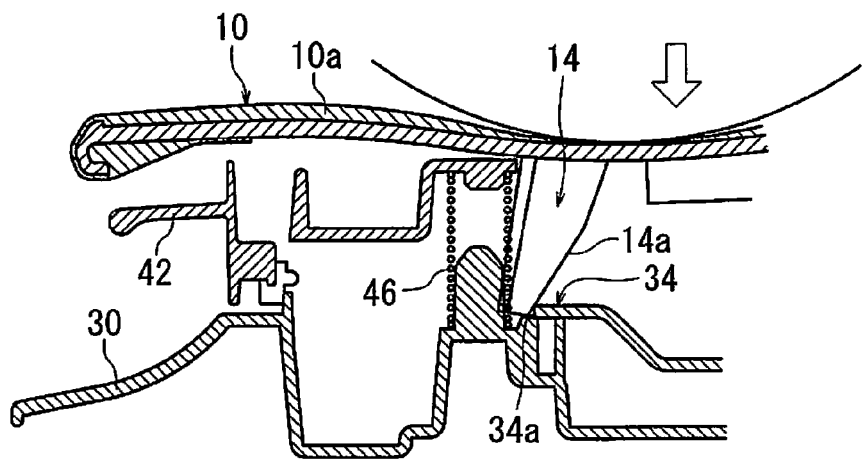
FIG. 9 is a vertical cross-sectional view of the front portion of the console box near the rib when the front portion of the door receives a large shock.
Figure 10:
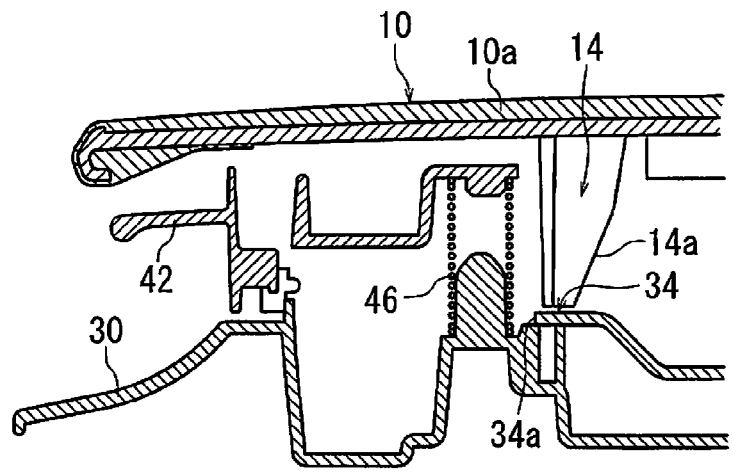
FIG. 10 is a vertical cross-sectional view of the front portion of the console box near the rib after the front portion of the door receives a large shock.

As shown in FIG. 8, the door inner 30 has the abutment surface 34 facing the rib 14 of the door outer 10. As shown in FIGS. 9 and 10, when the front portion of the door outer 10 is bent, the inclined sides 14a of the rib 14 contact an end portion 34a of the abutment surface 34.

At this time, a large frictional force is generated between the rib 14 and the abutment surface 34. The frictional force absorbs the shock when the head of the occupant hits the surface of the door outer 10. As a result, it is possible to suppress the shock that the head of the occupant receives from the door outer 10. As shown in FIG. 10, the front portion of the bent door outer 10 is restored to the condition before the bending due to its own restoring force.

Figure 12:
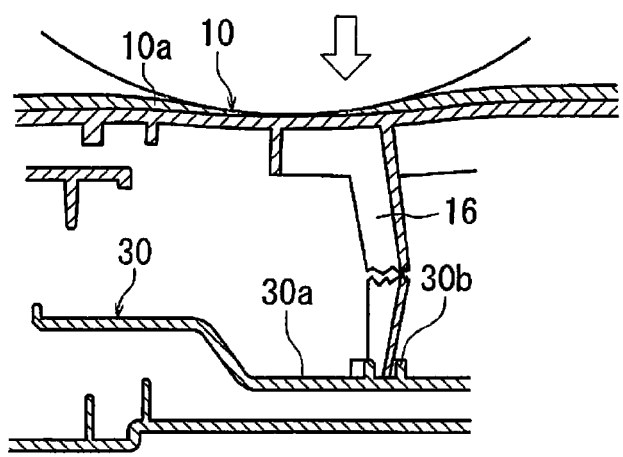
FIG. 12 is a vertical cross-sectional view of the part of the console box near another rib when the front portion of the door receives a large shock.

As shown in FIG. 11, the door inner 30 has the L-shaped ribs 16. As shown in FIG. 12, when the front portion of the door outer 10 is bent, the distal ends of the ribs 16 contact the bottom surface 30a of the door inner 30. Further, the ribs 16 are broken at some midpoint in the longitudinal direction thereof. As a result, the ribs 16 can absorb the shock that the head of the occupant receives from the door outer 10. Thus, it is possible to suppress the shock that the head of the occupant receives from the door outer 10.

Figure 13:
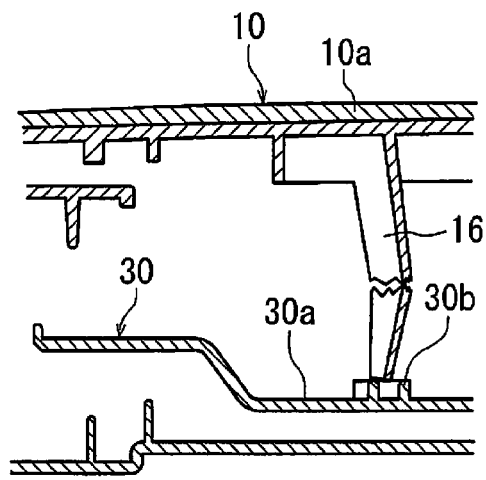
FIG. 13 is a vertical cross-sectional view of the part of the console box near another rib after the front portion of the door receives a large shock.

When the front portion of the door outer 10 is bent, the respective distal ends of the ribs 16 are guided by the guides 30b. Thus, it is possible for the ribs 16 to assuredly be broken at some midpoint in the longitudinal direction thereof. As shown in FIG. 13, the front portion of the door outer 10 is restored to the position before the bending due to its own restoring force.

Figure 16:
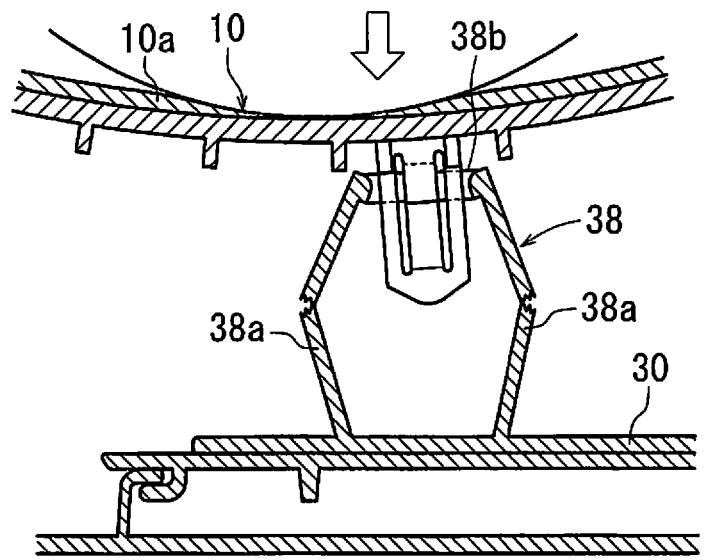
FIG. 16 is a vertical cross-sectional view of the part of the console box near the buffer body when the front portion of the door receives a large shock.
Figure 17:
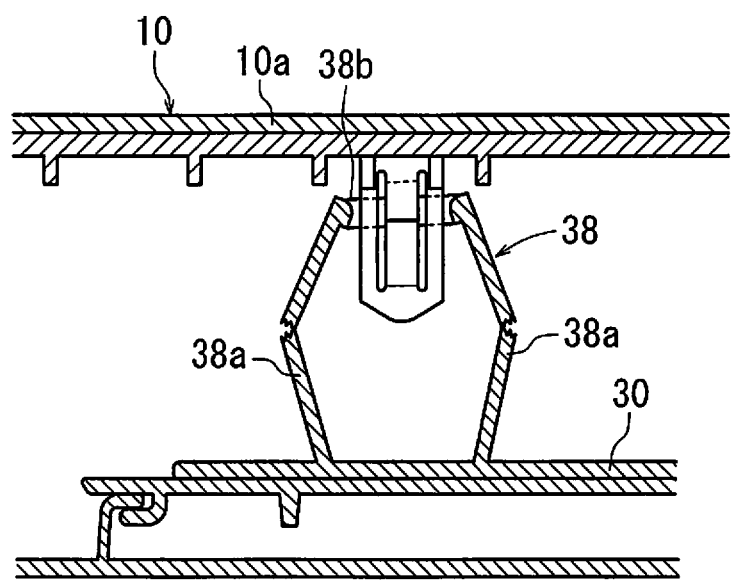
FIG. 17 is a vertical cross-sectional view of the part of the console box near the buffer body after the front portion of the door receives a large shock.

As shown in FIG. 15, the door inner 30 has a buffer body 38. As shown in FIG. 16, when the front portion of the door outer 10 is bent, the pair of legs 38a of the buffer body 38 are broken at some midpoint in the longitudinal direction thereof. As a result, it is possible for the buffer body 38 to absorb the shock that the head of the occupant receives from the door outer 10. Thus, it is possible to suppress the shock that the head of the occupant receives from the door outer 10. As shown in FIG. 17, using its own restoring force, the front portion of the bent door outer 10 is restored to the position before the bending.

Figure 18:
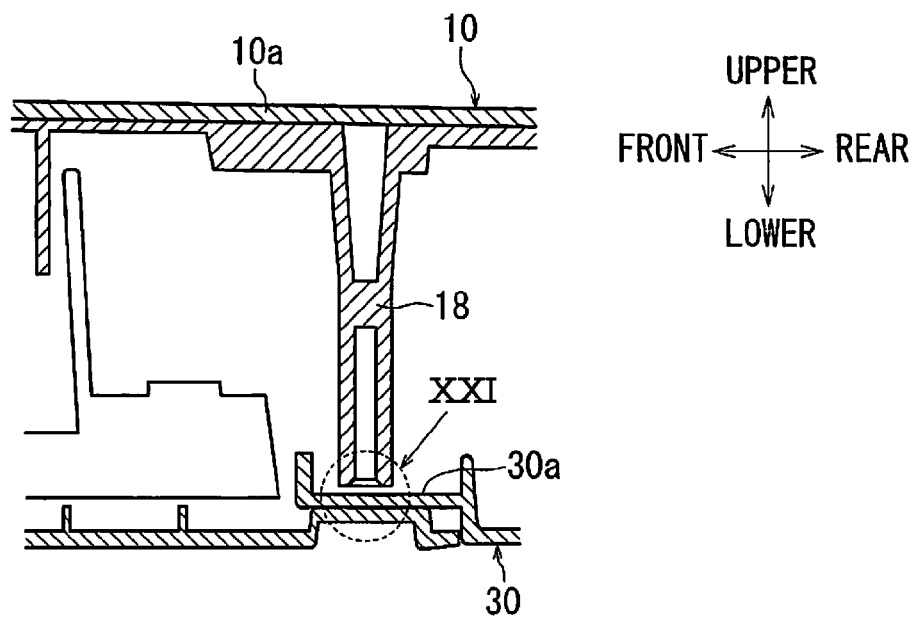
FIG. 18 is a vertical cross-sectional view of a part of the console box near a boss taken along line XVIII-XVIII in FIG. 1.
Figure 19:
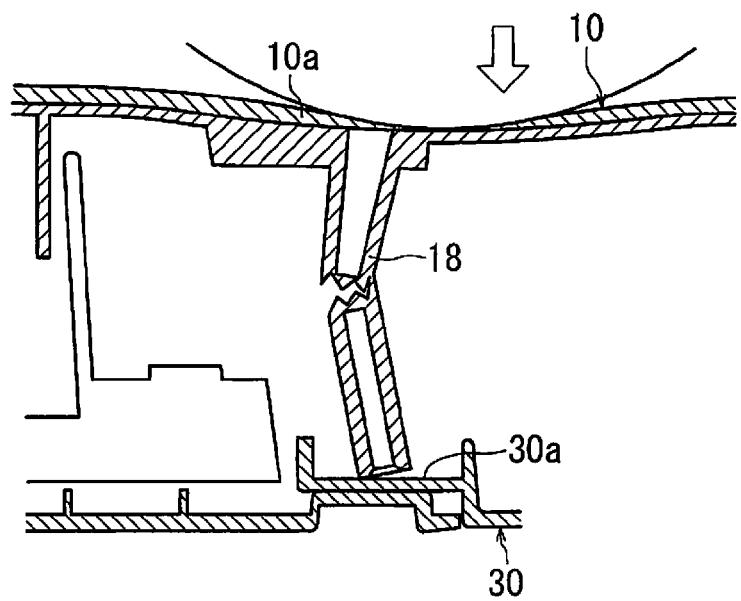
FIG. 19 is a vertical cross-sectional view of the part of the console box near the boss when a rear portion of the door receives a large shock.
Figure 20:
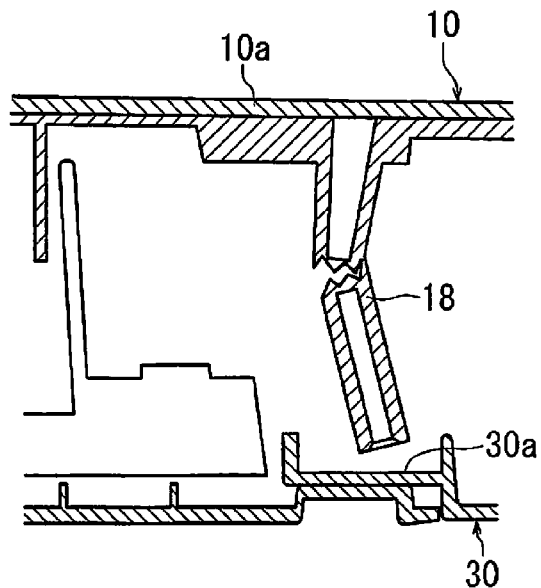
FIG. 20 is a vertical cross-sectional view of the part of the console box near the boss after the rear portion of the door receives a large shock.

When, in the normal condition shown in FIG. 18, a large shock is applied to the rear portion of the door 3 as shown in FIG. 19, the rear portion of the door outer 10 is bent. As a result, the distal ends of the bosses 18 of the door outer 10 contact the bottom surface 30a of the door inner 30. Further, the bosses 18 are broken at some midpoint in the longitudinal direction thereof. As a result, it is possible for the bosses 18 to absorb the shock that the head of the occupant receives from the door outer 10. Thus, it is possible to suppress the shock that the head of the occupant receives from the door outer 10. As shown in FIG. 20, using its own restoring force, the rear portion of the door outer 10 that is bent is restored to the position before the bending.

Figure 22:
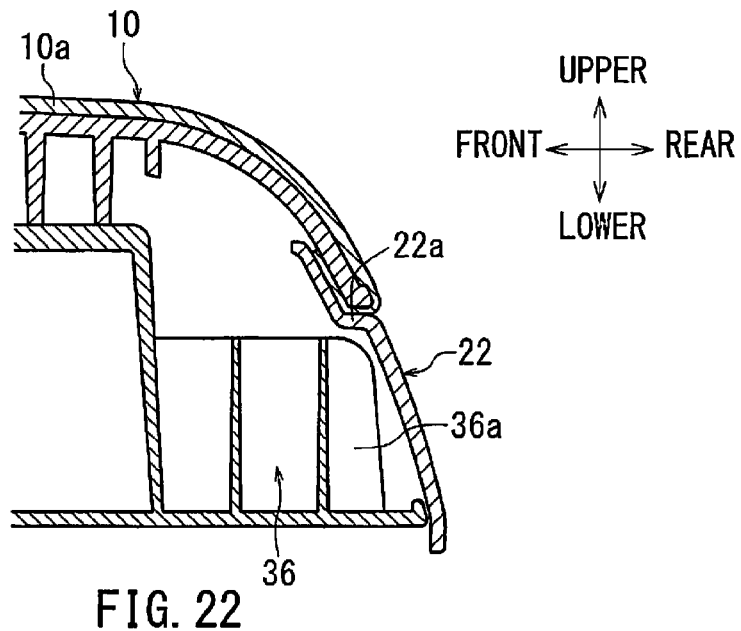
FIG. 22 is a vertical cross-sectional view of a rear portion of the console box taken along line XXII-XXII in FIG. 1.
Figure 23:
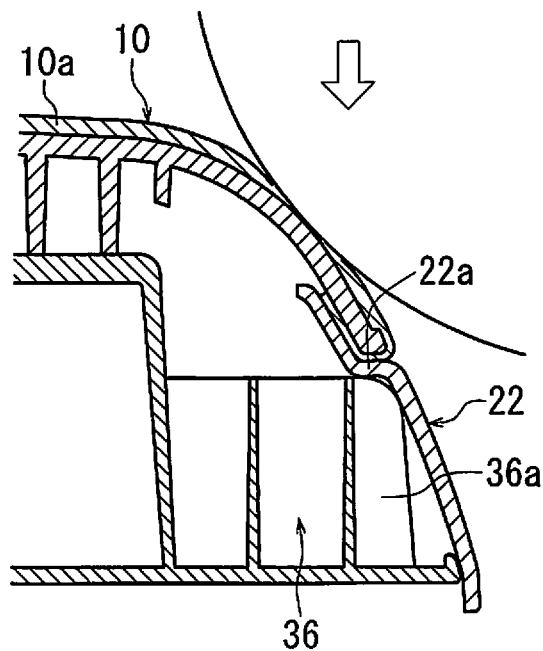
FIG. 23 is a vertical cross-sectional view of the rear portion of the console box when the rear portion of the door receives a large shock.
Figure 24:
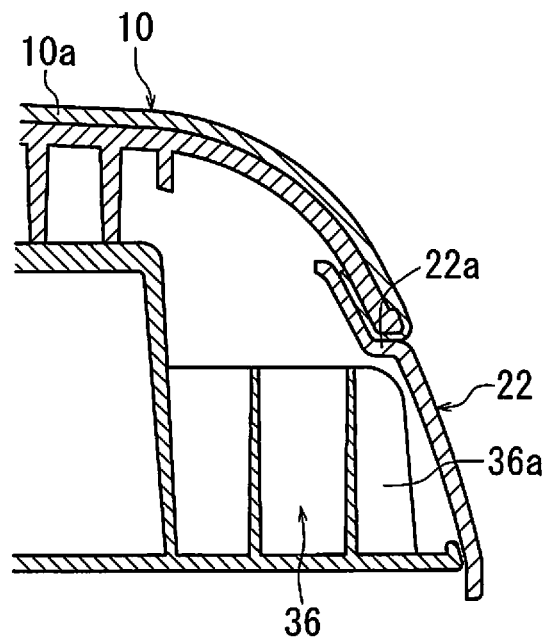
FIG. 24 is a vertical cross-sectional view of the rear portion of the console box after the rear portion of the door receives a large shock.

As shown in FIG. 22, the door inner 30 has a boss 36 provided with a rib 36a. The rear garnish 22 has a step portion 22a facing the distal end portion of the rib 36a. As shown in FIG. 23, when the rear portion of the door outer 10 is bent, the step portion 22a contacts the rib 36a. As a result, it is possible to prevent detachment of the rear garnish 22 from the door 3. As shown in FIG. 24, using its own restoring force, the rear portion of the door outer 10 is restored to the condition before the bending.

As described above, when the head of the occupant hits the surface of the front portion of the door outer 10, the pins 42a are detached from the mounting holes 32a of the mounting walls 32. As a result, the knob 42 of the lock mechanism 40 is detached. Thus, when the head of the occupant hits the door outer 10, the door outer 10 bent by the shock is not regulated in its bending by the lock mechanism 40 even if the door 3 is provided with the lock mechanism 40. As a result, the bending amount of the door outer 10 increases. This makes it possible to sufficiently suppress the shock that the head of the occupant receives from the door outer 10.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIG. 4, the knob 42 may have pins 42a, and the mounting walls 32 may have mounting holes 32a into which the pins 42a are inserted. Alternatively, the mounting walls 32 may have pins 42a, while the knob 42 may have mounting holes 32a into which the pins 42a are inserted.

The pins 42a may have a columnar shape, a semi-spherical shape, a cylindrical shape or the like. The mounting holes 32a may be holes or recesses or have an arcuate shape capable of receiving pins.

The invention claimed is:

1. A door for a console box comprising:
   a door outer;
   a door inner mounted to the door outer; and
   a lock mechanism configured to releasably lock the door at a position where the door closes an opening of a box main body of the console box, wherein
   the door inner comprises a pair of mounting walls,
   the lock mechanism comprises a knob provided mounted between the pair of mounting walls, wherein the knob is operated when releasing the lock mechanism, and
   the door outer comprises a pair of ribs configured to push the pair of mounting walls away from each other and configured to detach the knob from the mounting walls when the door outer receives a shock toward the door inner.

2. The door for the console box of claim 1, wherein the knob is pivotably mounted to the pair of mounting walls by a pair of pins to bridge the pair of mounting walls.

3. The door for the console box of claim 2, wherein the pins are provided on one of the mounting walls or the knob, and
   the other of the mounting walls or the knob is provided with mounting holes into which the pins are set, and the door is configured so that the pins are detached from the mounting holes when the pair of mounting walls are pushed away from each other.

* * * * *